United States Patent
Wu et al.

(10) Patent No.: US 9,581,787 B2
(45) Date of Patent: Feb. 28, 2017

(54) METHOD OF USING A LIGHT-FIELD CAMERA TO GENERATE A THREE-DIMENSIONAL IMAGE, AND LIGHT FIELD CAMERA IMPLEMENTING THE METHOD

(71) Applicants: NATIONAL TAIWAN UNIVERSITY, Taipei (TW); LITE-ON TECHNOLOGY CORP., Taipei (TW)

(72) Inventors: Jiun-Huei Proty Wu, Taipei (TW); Zong-Sian Li, Taipei (TW)

(73) Assignees: National Taiwan University, Taipei (TW); Lite-On Technology Corp., Taipei (TW)

( * ) Notice: Subject to any disclaimer, the term of this patent is extended or adjusted under 35 U.S.C. 154(b) by 191 days.

(21) Appl. No.: 14/658,517

(22) Filed: Mar. 16, 2015

(65) Prior Publication Data
US 2015/0268451 A1    Sep. 24, 2015

(30) Foreign Application Priority Data
Mar. 21, 2014    (TW) .............................. 103110699 A (51) Int. Cl.
| | | |
|---|---|---|
| H04N 15/00 | (2006.01) | |
| H04N 13/00 | (2006.01) | |
| H04N 13/02 | (2006.01) | |
| G02B 13/00 | (2006.01) | |
| H04N 5/225 | (2006.01) | |
| H04N 5/265 | (2006.01) | |
| H04N 13/04 | (2006.01) | |

(52) U.S. Cl.
CPC ........ *G02B 13/0015* (2013.01); *H04N 5/2254* (2013.01); *H04N 5/265* (2013.01); *H04N 13/0203* (2013.01); *H04N 13/0207* (2013.01); *H04N 13/0429* (2013.01)

(58) Field of Classification Search
None
See application file for complete search history.

(56) References Cited

U.S. PATENT DOCUMENTS

| | | | | |
|---|---|---|---|---|
| 2015/0146032 A1* | 5/2015 | Rime | ....................... | H04N 7/01 348/222.1 |
| 2015/0286340 A1* | 10/2015 | Send | ....................... | G01S 17/46 345/175 |
| 2016/0018645 A1* | 1/2016 | Haddick | ................. | G06T 19/20 345/8 |
| 2016/0255327 A1* | 9/2016 | Cole | ....................... | G06F 3/012 348/43 |

* cited by examiner

*Primary Examiner* — Frederick Bailey
*Assistant Examiner* — Talha M Nawaz
(74) *Attorney, Agent, or Firm* — Rosenberg, Klein & Lee (57) ABSTRACT

A method is provided to generate a 3D image using a light-field camera that includes a main lens, a micro-lens array, a light sensing component, and an image processing module. The micro-lens array forms a plurality of adjacent micro-images at different positions of the light sensing component. Each micro-image includes multiple image zones corresponding to different viewing angles. For each micro-image, the image processing module obtains image pixel values from the image zones, so as to generate camera images corresponding to different viewing angles. The image processing module combines the camera images to generate the 3D image.

18 Claims, 7 Drawing Sheets

METHOD OF USING A LIGHT-FIELD CAMERA TO GENERATE A THREE-DIMENSIONAL IMAGE, AND LIGHT FIELD CAMERA IMPLEMENTING THE METHOD

CROSS-REFERENCE TO RELATED APPLICATION

This application claims priority to Taiwanese Application No. 103110699, filed on Mar. 21, 2014.

BACKGROUND OF THE INVENTION

1. Field of the Invention

The invention relates to a method to generate a three-dimensional (3D) image, and more particularly to a method of using a light-field camera to generate a 3D image.

2. Description of the Related Art

A conventional method for generating a 3D image requires at least two cameras to obtain parallax images for synthesis. Since parameters (e.g., an aperture, a shutter, a focal length, a light sensing component, etc.) of the cameras may not be identical, and the images obtained by the cameras may be out of focus, precision of the parallax images thus obtained may be insufficient. In order to solve such issues encountered in the conventional method, delicate cameras and complex image processing algorithms may be used for calibration of the parameters to obtain the parallax images and to synthesize the 3D image, resulting in higher costs and long times for calculation.

SUMMARY OF THE INVENTION

Therefore, an object of the present invention is to provide a method of using a light-field camera to generate a three-dimensional (3D) image. The method may reduce costs and amount of calculations in generation of images at different viewing angles.

According to one aspect of the present invention, a method of using a light-field camera to generate a three-dimensional (3D) image is provided. The light-field camera includes a main lens for collecting light field information from a scene, a micro-lens array that includes a plurality of microlenses, a light sensing component, and an image processing module. The method comprises:

(a) forming, using the micro-lens array, a plurality of adjacent micro-images at different positions of the light sensing component according to the light field information collected by the main lens, each of the micro-images corresponding to a respective one of the microlenses, and including first to $n^{th}$ image zones that respectively correspond to first to $n^{th}$ viewing angles, where n is an integer and $n \geq 2$;

(b) generating, by the image processing module, a number n of camera images respectively corresponding to the first to $n^{th}$ viewing angles, each of the camera images being generated by:
  obtaining an image pixel value from an $i^{th}$ image zone of each of the micro-images, so as to form one of the camera images that corresponds to the $i^{th}$ viewing angle, where i is a positive integer and $i \leq n$; and (c) combining, by the image processing module, the camera images to generate the 3D image.

Another object of the present invention is to provide a light-field camera capable of generating a 3D image.

According to another aspect of the present invention, a light-field camera comprises:

a main lens, a micro-lens array including a plurality of microlenses, and a light sensing component arranged in order from an object side to an image side,
  the main lens to collect light field information from a scene,
  the micro-lens array to form a plurality of adjacent micro-images at different positions of the light sensing component according to the light field information collected by the main lens, each of the micro-images corresponding to a respective one of the microlenses, and including first to $n^{th}$ image zones that respectively correspond to first to $n^{th}$ viewing angles, where n is an integer and $n \geq 2$; and
an image processing module including:
  an image processing unit to generate a number n of camera images respectively corresponding to the first to $n^{th}$ viewing angles, each of the camera images being generated by:
    obtaining an image pixel value from an $i^{th}$ image zone of each of the micro-images, so as to form one of the camera images that corresponds to the $i^{th}$ viewing angle, where i is a positive integer and $i \leq n$; and
  an image synthesizing unit to combine the camera images to generate a three-dimensional (3D) image.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE EMBODIMENT

Figure 1:
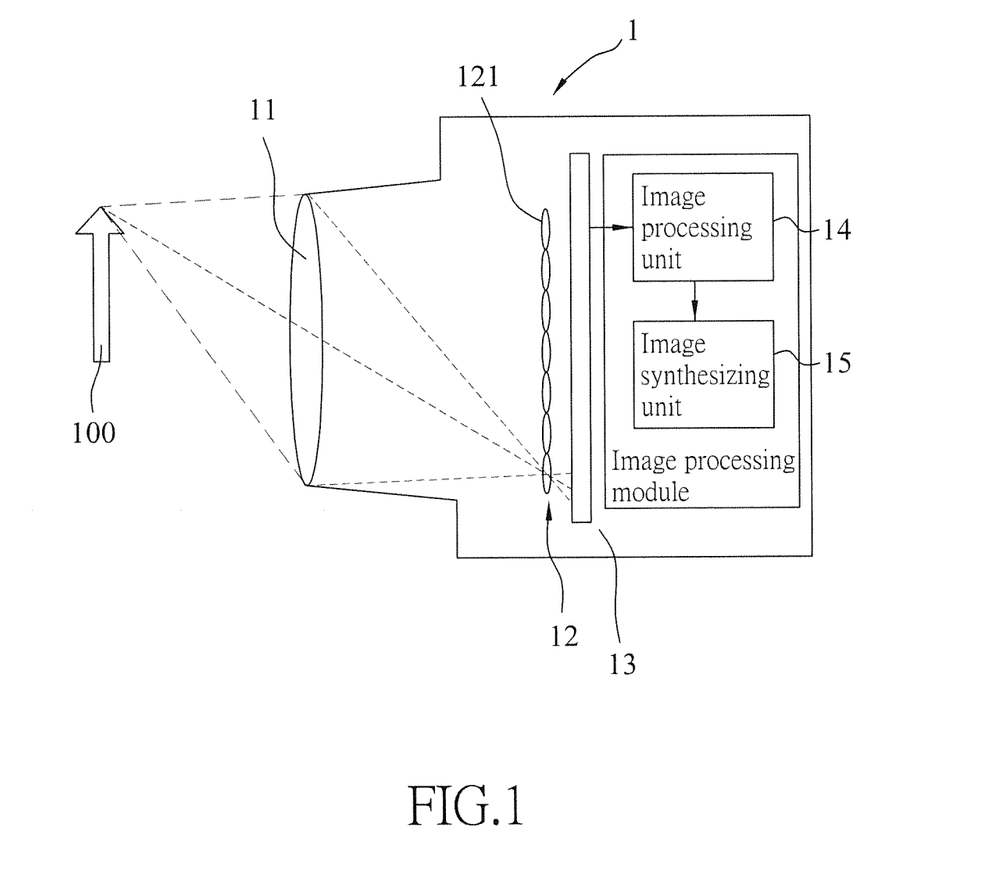
FIG. 1 is a schematic diagram illustrating an embodiment of a light-field camera according to the present invention.
Figure 2:
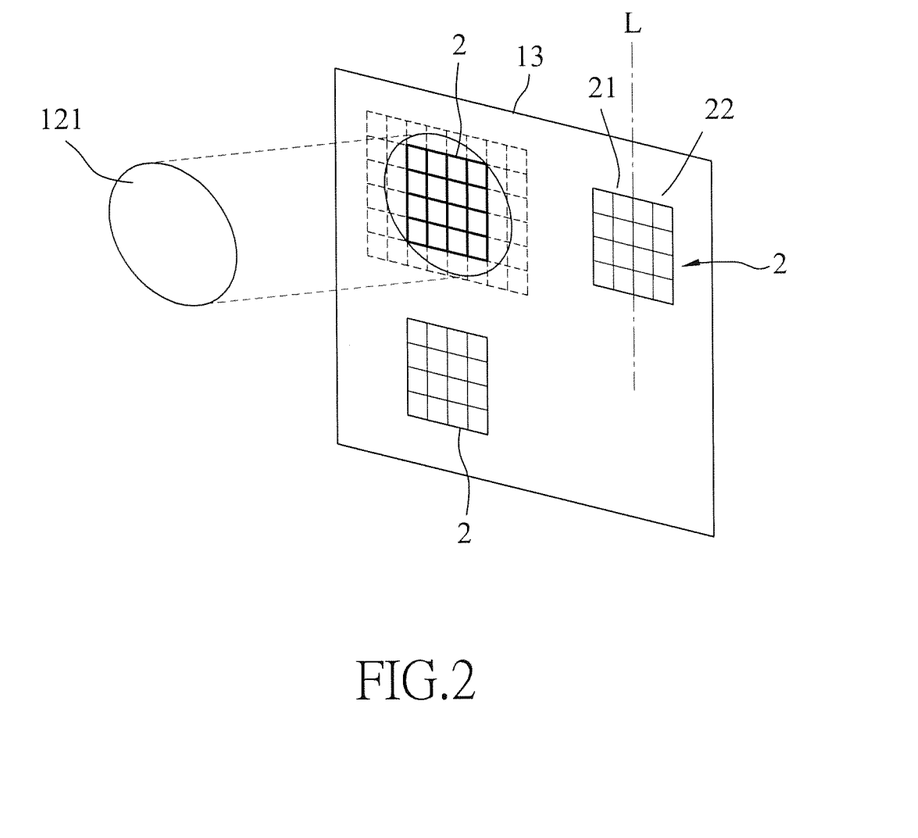
FIG. 2 is a schematic diagram illustrating a plurality of micro-images formed on a light sensing component of the embodiment.
Figure 3:
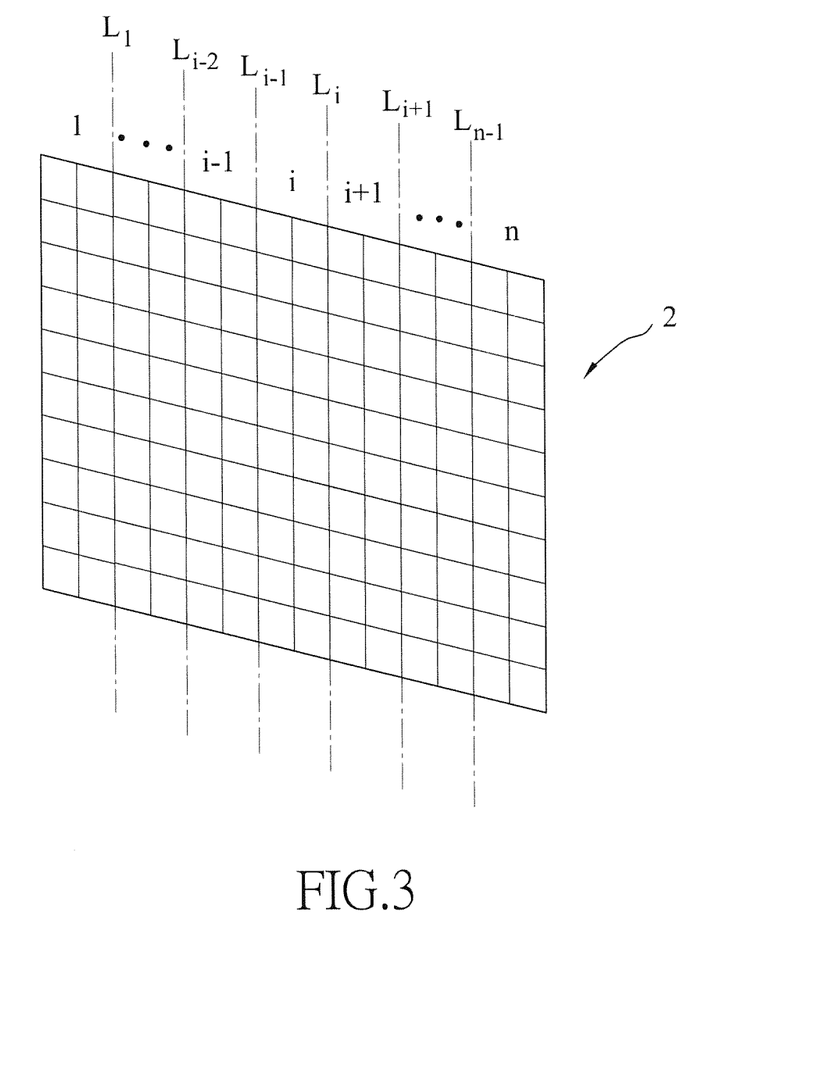
FIG. 3 is a schematic diagram illustrating a micro-image that includes a plurality of image zones.

Referring to FIGS. 1 to 3, the embodiment of the light-field camera 1 adapted to generate a three-dimensional (3D) image according to this invention is shown to include a main lens 11, a micro-lens array 12 and a light sensing component 13 arranged in the given order from an object side to an image side, and an image processing module that includes an image processing unit 14 and an image synthesizing unit 15.

The micro-lens array 12 includes a plurality of microlenses 121. In this embodiment, the microlenses 121 are arranged in a rectangular array.

The main lens 11 collects light field information from a scene 100. The microlenses 121 of the micro-lens array 12 form a plurality of adjacent micro-images 2 at different positions of the light sensing component 13 according to the light field information collected by the main lens 11. Each of the micro-images 2 corresponds to a respective one of the microlenses 121, and includes first to $n^{th}$ image zones (referring to FIG. 3, the micro-image 2 has n image zones divided by n−1 imaginary lines $L_1$ to $L_{n-1}$) that respectively correspond to first to $n^{th}$ viewing angles, where n is an integer and n≥2. Each image zone of the micro-image 2 has p×q pixels, where p, q are integers. In one embodiment, the micro-images 2 all have the same number of pixels.

The image processing unit 14 generates a number n of camera images respectively corresponding to the first to $n^{th}$ viewing angles. Each of the camera images is generated by obtaining an image pixel value from an $i^{th}$ image zone of each of the micro-images 2, so as to form one of the camera images that corresponds to the $i^{th}$ viewing angle, where i is a positive integer and i≤n. For each of the image zones, the image pixel value thus obtained is associated with at least one pixel that is completely covered by a projection of the corresponding one of the microlenses 121 onto the light sensing component 13.

In this embodiment, n=2, i.e., each micro-image 2 has a first image zone 21 and a second image zone 22. Note that the present invention should not be limited in this respect, and n may be greater than 2 in other embodiments. For each micro-image 2, the image processing unit 14 obtains an image pixel value from each of the first and second image zones 21, 22 to serve as a respective one of a first image pixel value and a second image pixel value. The image processing unit 14 then generates a first camera image corresponding to a first viewing angle according to the first image pixel value obtained from the first image zone 21 of each of the micro-images 2, and generates a second camera image corresponding to a second viewing angle according to the second image pixel value obtained from the second image zone 22 of each of the micro-images 2. In this embodiment, the first and second image zones 21, 22 of each of the micro-images 2 are disposed at two opposite portions of the corresponding micro-image 2. As an example, the first image zone 21 is disposed at a left portion of the corresponding micro-image 2, and the second image zone 22 is disposed at a right portion of the corresponding micro-image 2. Note that positions of the first and second image zones 21, 22 may be interchanged, and the present invention should not be limited in this respect. Referring to FIG. 2, the first image zone 21 is disposed at a left side of an imaginary line L, and the image processing unit 14 arranges the first image pixel value obtained from the first image zone 21 of each of the micro-images 2 to generate the first camera image corresponding to a left viewing angle (e.g., a numeral 41 in FIG. 7). On the other hand, the second image zone 22 is disposed at a right side of the imaginary line L, and the image processing unit 14 arranges the second image pixel value obtained from the second image zone 22 of each of the micro-images 2 to generate the second camera image corresponding to a right viewing angle (e.g., a numeral 42 in FIG. 7).

In a first implementation, each of the first and second image pixel values is obtained from one pixel of the respective one of the image zones 21, 22 that is completely covered by the projection of the corresponding microlens 121 onto the light sensing component 13. As shown in FIG. 2, the first and second image zones 21, 22 include all pixels of the micro-image 2 that are completely covered by the projection of the microlens 121, which are represented using bold lines. The other pixels of the micro-image 2 that are not completely covered by the projection of the microlens 121 are represented using dotted lines, and are not the pixels used to obtain the first and second image pixel values. In this implementation, the first image pixel value obtained from the first image zone 21 of each of the micro-images is the pixel value of a single pixel of the first image zone 21, where said single pixel is called a first image pixel herein. The second image pixel value obtained from the second image zone 22 of each of the micro-images is the pixel value of a single pixel of the second image zone 22, where said single pixel is called a second image pixel herein. The first image pixel and the second image pixel are disposed at symmetrical positions with respect to the imaginary line L. In addition, the first image pixels are located at corresponding positions with respect to the micro-images 2, and the second image pixels are located at corresponding positions with respect to the micro-images 2. In one embodiment, the first image pixel is disposed at or adjacent to an edge (e.g., a left edge) of the first image zone 21, and the second image pixel is disposed at or adjacent to an edge (e.g., a right edge) of the second image zone 22, which is symmetrical to the edge of the first image zone 21 with respect to the imaginary line L. In another embodiment, the first image pixel is located at or adjacent to a center (e.g., a central pixel) of the edge of the first image zone 21, and the second image pixel is located at or adjacent to a center of the edge of the second image zone 22. As an example, when the first and second image zones 21, 22 are disposed at the left and right portions of the corresponding micro-image 2, the first and second image pixels respectively may be central pixels of the leftmost and rightmost pixel columns of the micro-image 2 (see FIG. 5), or pixels adjacent to centers of the leftmost and rightmost pixel columns of the micro-image 2 (see FIG. 4). Similarly, when the first and second image zones 21, 22 are disposed at upper and lower portions of the corresponding micro-image 2, the first and second image pixels respectively may be central pixels of the uppermost and lowermost pixel rows of the micro-image 2, or pixels adjacent to centers of the uppermost and lowermost pixel rows of the micro-image 2.

Figure 4:
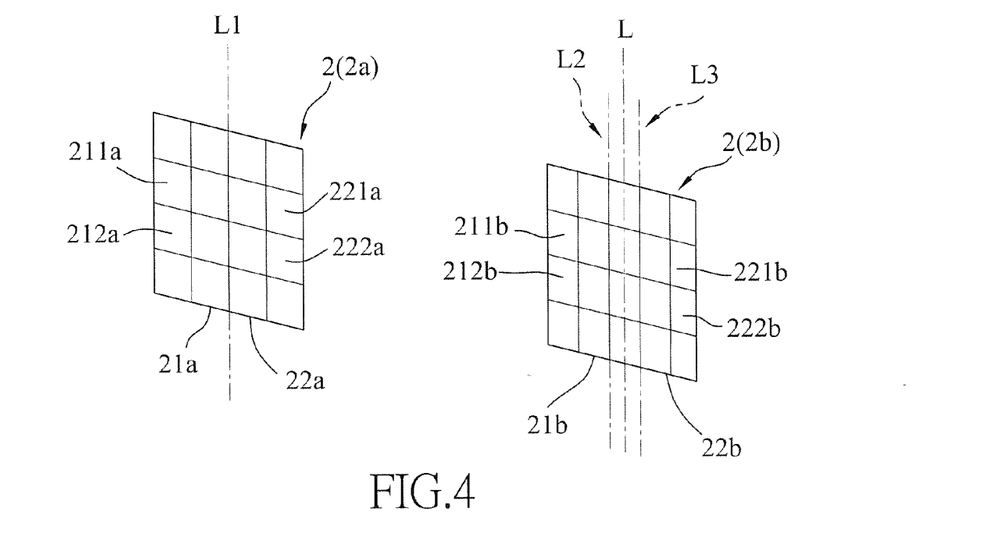
FIG. 4 is a schematic diagram illustrating an example in which each of the micro-images has an even number of pixel rows in a vertical direction.
Figure 5:
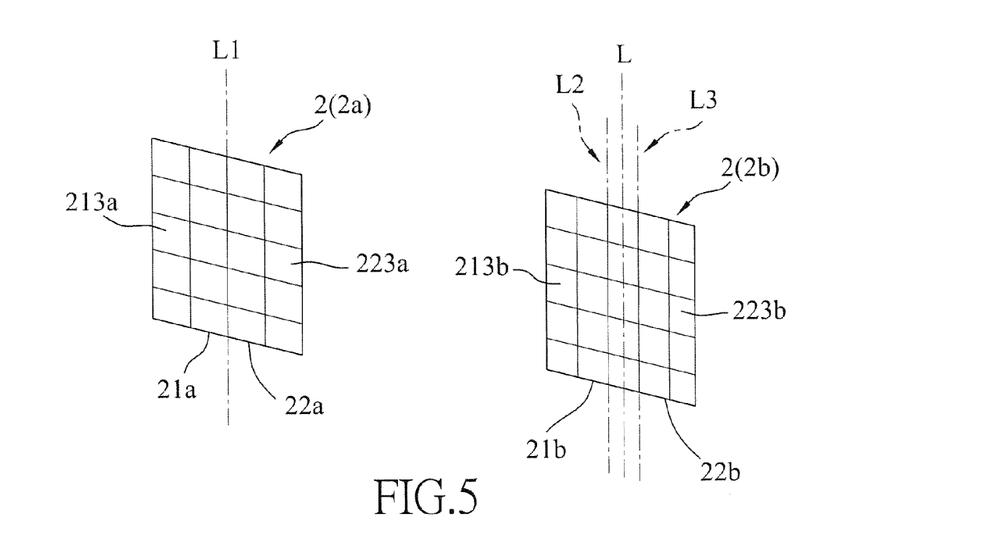
FIG. 5 is a schematic diagram illustrating an example in which each of the micro-images has an odd number of pixel rows in the vertical direction.

FIGS. 4 and 5 show examples in which the first image zone 21a, 21b and the second image zone 22a, 22b of each micro-image 2 are disposed at two horizontally opposite sides (i.e., left side and right side) with respect to the vertical imaginary line L1, L. It may be derived from FIGS. 4 and 5 that, in some examples, the first image zone and the second image zone of each micro-image may be disposed at two vertically opposite sides (i.e., upper side and lower side) with respect to a horizontal imaginary line. Note that the micro-image 2 is also denoted as 2a or 2b in FIGS. 4 and 5.

Referring to FIG. 4, it is exemplified that each of the micro-images 2 has an even number of pixel rows in a vertical direction. When the micro-image 2 has an even number of pixel columns in a horizontal direction, like the micro-image 2a, the first image zone 21a is disposed at the left side of the imaginary line L1, and the second image zone 22a is disposed at the right side of the imaginary line L1. The imaginary line L1 is an imaginary central line of the first and second image zones 21a, 22a. In one embodiment, the first image pixel value is obtained from the pixel 211a of the first image zone 21a, and the second image pixel value is obtained from the pixel 221a of the second image zone 22a. Note that the pixels 211a and 221a are disposed at symmetrical positions with respect to the imaginary line L1. In another embodiment, the first image pixel value is obtained from the pixel 212a of the first image zone 21a, and the second image pixel value is obtained from the pixel 222a of the second image zone 22a. Note that the pixels 212a and 222a are disposed at symmetrical positions with respect to the imaginary line L1. When the micro-image 2 has an odd number of pixel columns in the horizontal direction, like the micro-image 2b, the first image zone 21b is disposed at the left side of the imaginary line L2, and the second image zone 22b is disposed at the right side of the imaginary line L3. The imaginary line L between the imaginary lines L2, L3 is the imaginary central line of the first and second image zones 21b, 22b. In one embodiment, the first image pixel value is obtained from the pixel 211b of the first image zone 21b, and the second image pixel value is obtained from the pixel 221b of the second image zone 22b. Note that the pixels 211b and 221b are disposed at symmetrical positions with respect to the imaginary line L. In another embodiment, the first image pixel value is obtained from the pixel 212b of the first image zone 21b, and the second image pixel value is obtained from the pixel 222b of the second image zone 22b. Note that the pixels 212b and 222b are disposed at symmetrical positions with respect to the imaginary line L.

Referring to FIG. 5, it is exemplified that each of the micro-images 2 has an odd number of pixel rows in the vertical direction. When the micro-image 2 has an even number of pixel columns in the horizontal direction, like the micro-image 2a, the first image zone 21a is disposed at the left side of the imaginary line L1, and the second image zone 22a is disposed at the right side of the imaginary line L1. The imaginary line L1 is an imaginary central line of the first and second image zones 21a, 22a. In one embodiment, the first image pixel value is obtained from the pixel 213a of the first image zone 21a, and the second image pixel value is obtained from the pixel 223a of the second image zone 22a. Note that the pixels 213a and 223a are disposed at symmetrical positions with respect to the imaginary line L1. When the micro-image 2 has an odd number of pixel columns in the horizontal direction, like the micro-image 2b, the first image zone 21b is disposed at the left side of the imaginary line L2, and the second image zone 22b is disposed at the right side of the imaginary line L3. The imaginary line L between the imaginary lines L2, L3 is the imaginary central line of the first and second image zones 21b, 22b. In one embodiment, the first image pixel value is obtained from the pixel 213b of the first image zone 21b, and the second image pixel value is obtained from the pixel 223b of the second image zone 22b. Note that the pixels 213b and 223b are disposed at symmetrical positions with respect to the imaginary line L.

As a result, complex image processing algorithms are not required in this implementation for obtaining the image pixel values that form the first and second camera images, to thereby reduce processing time for calculation of processing the first and second camera images. The first and second camera images are used to simulate parallax between left and right eyes for obtaining a 3D image.

In a second implementation, each of the first and second image zones 21, 22 has a plurality of pixels each having a pixel value. In one embodiment, the first and second image zones 21, 22 have the same number of pixels. Referring to FIG. 4, as to the micro-image 2a, the first image zone 21a is disposed at the left side of the imaginary line L1, and the second image zone 22a is disposed at the right side of the imaginary line L1. The first image pixel value is obtained from the first image zone 21a by averaging the pixel values of all of the pixels of the first image zone 21a, and the second image pixel value is obtained from the second image zone 22a by averaging the pixel values of all of the pixels of the second image zone 22a. As to the micro-image 2b, in one example, the first image zone 21b is disposed at the left side of the imaginary line L2, and the second image zone 22b is disposed at the right side of the imaginary line L3. The first image pixel value is obtained from the first image zone 21b by averaging the pixel values of all of the pixels of the first image zone 21b, and the second image pixel value is obtained from the second image zone 22b by averaging the pixel values of all of the pixels of the second image zone 22b. In another example, the first image zone 21b is disposed at the left side of the imaginary line L3 (i.e., the first image zone 21b includes all of the pixels of the micro-image 2b that are disposed at the left side of the imaginary line L3), and the second image zone 22b is disposed at the right side of the imaginary line L2 (i.e., the second image zone 22b includes all of the pixels of the micro-image 2b that are disposed at the right side of the imaginary line L2). In other words, the first and second image zones 21b and 22b partly overlap. The first image pixel value is obtained from the first image zone 21b by averaging the pixel values of all of the pixels of the first image zone 21b, and the second image pixel value is obtained from the second image zone 22b by averaging the pixel values of all of the pixels of the second image zone 22b. As to FIG. 5, for the micro-images 2a and 2b, the first and second image pixel values are obtained in the same way as that illustrated for FIG. 4, and further details thereof are omitted herein for the sake of brevity. It should be noted that, via averaging the pixel values of all of the pixels of each of the first and second image zones 21, 22, the first and second camera images thus generated may be respectively focused on specific locations (i.e., may respectively have specific focal lengths that may be the same or different), and objects at those locations may be made clear.

Figure 7:
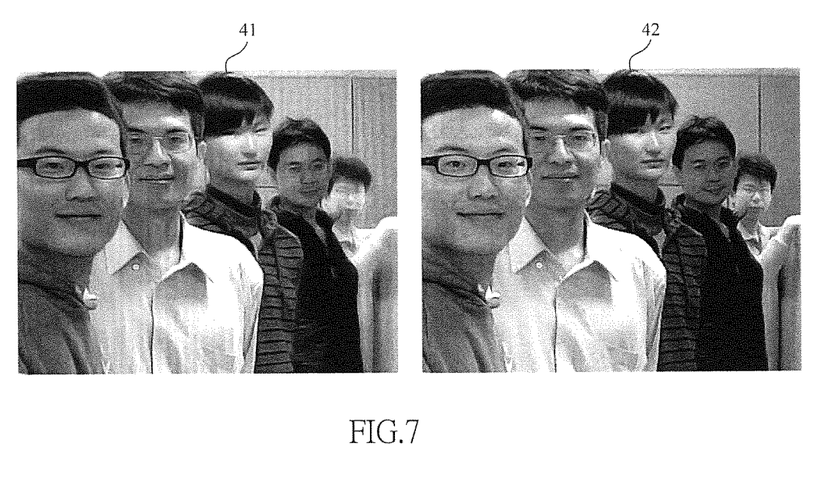
FIG. 7 is a schematic diagram showing camera images of respective left and right viewing angles obtained using the embodiment.

In this embodiment, after the image processing unit 14 obtains the first and second image pixel values for each of the micro-images 2 by using one of the abovementioned methods, the image processing unit 14 writes the first image pixel values thus obtained into a bitmap image according to the first image pixel values and the corresponding positions of the related micro-images 2 on the light sensing component 13, so as to generate the first camera image, and writes the second image pixel values thus obtained into a bitmap image according to the second image pixel values and the corresponding positions of the related micro-images 2 on the light sensing component 13, so as to generate the second camera image. In FIG. 7, the first and second camera images 41, 42, which respectively correspond to the left and right viewing angles, are generated using the method of the first implementation.

Figure 8:
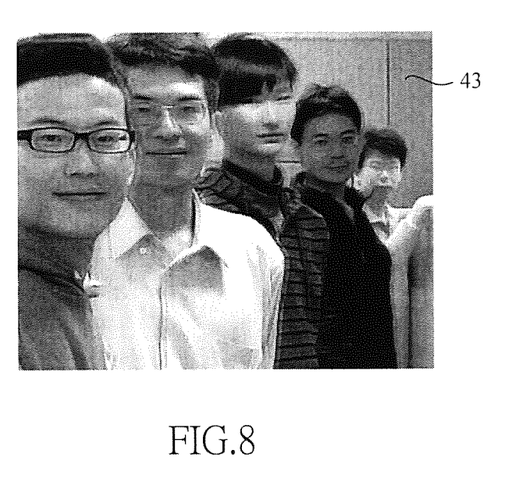
FIG. 8 is a schematic diagram showing a red-cyan 3D image obtained using the embodiment.

The image synthesizing unit 15 combines the n camera images, which respectively correspond to n different viewing angles, to generate a 3D image. For example, when n=2, the image synthesizing unit 15 performs synthesis according to the first and second camera images, so as to generate the 3D image. Detailed implementation for 3D image synthesis should be well-known to persons skilled in the art, and will not be described hereinafter. For example, anaglyph 3D technique (i.e., red cyan 3D technique), interleave 3D technique (current mainstream for 3D television and movie), polarized 3D technique (current mainstream for 3D computer screen), band-pass filtering 3D technique, etc., may be used for combining two 2D images to generate the 3D image. As to the aforementioned first implementation, when the first and second camera images 41, 42 (see FIG. 7) are combined to generate the 3D image using the anaglyph 3D technique, the result may be a red-cyan 3D image 43, as shown in FIG. 8. Wearing red/cyan 3D glasses to watch such an image may result in good 3D viewing experience.

Figure 6:
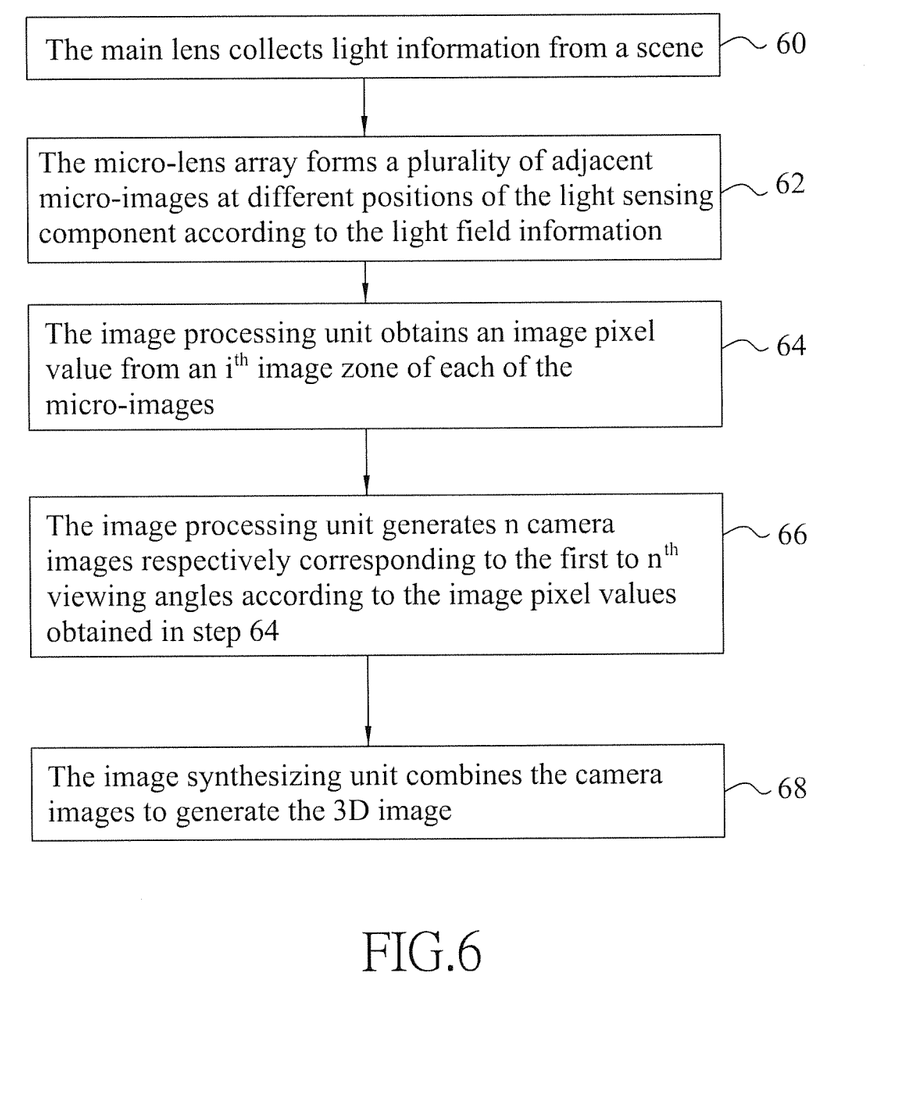
FIG. 6 is a flow chart illustrating steps of an embodiment of a method of using a light-field camera to generate a 3D image according to the present invention.

Referring to FIGS. 1, 2 and 6, an embodiment of a method of using the light-field camera 1 to generate a 3D image includes the following steps:

Step 60: The main lens 11 collects light information from a scene 100.

Step 62: The micro-lens array 12 forms a plurality of adjacent micro-images 2 at different positions of the light sensing component 13 according to the light field information collected by the main lens 11. Each of the micro-images 2 corresponds to a respective one of the microlenses 121, and includes first to $n^{th}$ image zones that respectively correspond to first to $n^{th}$ viewing angles.

Step 64: The image processing unit 14 obtains an image pixel value from an $i^{th}$ image zone of each of the micro-images 2, so as to form a camera image that corresponds to the $i^{th}$ viewing angle, where i is a positive integer and In one embodiment, the image processing unit 14 obtains the pixel value of one of the pixels of the $i^{th}$ image zone to serve as the image pixel value corresponding to the $i^{th}$ image zone.

In another embodiment, the image processing unit 14 obtains a weighted value of the pixel value of one of the pixels of the $i^{th}$ image zone, which is called an image pixel herein, and the pixel values of the pixels in a vicinity of the image pixel, which are called nearby pixels herein, to serve as the image pixel value corresponding to the $i^{th}$ image zone. For example, the nearby pixels may be the pixels adjacent to the image pixel at an upper side, a lower side, a left side and a right side of the image pixel, and a sum of weights of the image pixel and the nearby pixels is equal to 1. However, the present invention should not be limited to the abovementioned example. Numbers of the nearby pixels and the weights of the image pixel and the nearby pixels may be adjusted as required.

In yet another embodiment, the image processing unit 14 averages the pixel values of all of the pixels of the $i^{th}$ image zone to obtain the image pixel value corresponding to the $i^{th}$ image zone.

Step 66: The image processing unit 14 generates n camera images respectively corresponding to the first to n viewing angles by repeating step 64.

Step 68: The image synthesizing unit 15 combines the n camera images to generate the 3D image.

To sum up, the image processing unit 14 obtains the image pixel value from the $i^{th}$ image zone of each of the micro-images 2 on the light sensing component 13, writes the image pixel values associated with the $i^{th}$ image zone of the micro-images 2 into a camera image corresponding to the $i^{th}$ viewing angle, so as to generate n camera images respectively corresponding to n different viewing angles. During generation of the camera image corresponding to the $i^{th}$ viewing angle, the image processing unit 14 is not required to perform complex calculations, so as to reduce processing time that is required for calculations in the prior art. In addition, the light-field camera 1 of the present invention is suitable for use in any device having a camera module, such as a monitoring system, a handheld device (e.g., a mobile phone), an event data recorder (EDR), a notebook computer, an astronomical telescope, etc., or for cooperation with any device that may present or generate 3D objects, such as a 3D television, a 3D printer, 3D glasses, etc. 3D images may be quickly obtained by using only one light-field camera of the present invention. Particularly, in the aforementioned first implementation, parallax images may be obtained without any algorithm calculation such that the 3D image synthesis may be completed within a relatively short amount of time compared to the conventional 3D imaging techniques, and may not be out of focus since the images are obtained from actual light field information.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of using a light-field camera to generate a three-dimensional (3D) image, the light-field camera including a main lens for collecting light field information from a scene, a micro-lens array that includes a plurality of microlenses, a light sensing component, and an image processing module, said method comprising:
    (a) forming, using the micro-lens array, a plurality of adjacent micro-images at different positions of the light sensing component according to the light field information collected by the main lens, each of the micro-images corresponding to a respective one of the microlenses, and including first to $n^{th}$ image zones that respectively correspond to first to $n^{th}$ viewing angles, where n is an integer and n≥2;
    (b) generating, by the image processing module, a number n of camera images respectively corresponding to the first to $n^{th}$ viewing angles, each of the camera images being generated by:
        obtaining an image pixel value from an $i^{th}$ image zone of each of the micro-images, so as to form one of the camera images that corresponds to the $i^{th}$ viewing angle, where i is a positive integer and i≤n; and
    (c) combining, by the image processing module, the camera images to generate the 3D image.

2. The method according to claim 1, wherein, in step (b), for each of the image zones, the image pixel value thus obtained is associated with at least one pixel that is completely covered by a projection of the corresponding one of the microlenses onto the light sensing component.

3. The method according to claim 1, wherein each of the image zones has at least one pixel each having a pixel value, and in step (b), the image pixel value obtained from the $i^{th}$ image zone of each of the micro-images is associated with the pixel value of one of said at least one pixel of the $i^{th}$ image zone.

4. The method according to claim 3, wherein, in step (b), the image pixel value obtained from the $i^{th}$ image zone of each of the micro-images is the pixel value of one of said at least one pixel of the $i^{th}$ image zone.

5. The method according to claim 3, wherein each of the image zones has a plurality of said pixels, and in step (b), the image pixel value obtained from the $i^{th}$ image zone of each of the micro-images is a weighted value of the pixel value of one of the pixels of the $i^{th}$ image zone, and the pixel values of the pixels in a vicinity of said one of the pixels of the $i^{th}$ image zone.

6. The method according to claim 3, wherein:
    n=2, and each of the micro-images includes a first image zone and a second image zone;
    in step (b), the image pixel value obtained from the first image zone is a first image pixel value, and the image pixel value obtained from the second image zone is a second image pixel value;
    for each of the micro-images, said one of said at least one pixel of the first image zone whose pixel value is associated with the first image pixel value is a first image pixel, and said one of said at least one pixel of the second image zone whose pixel value is associated with the second image pixel value is a second image pixel; and the first image pixel and the second image pixel are disposed at symmetrical positions with respect to an imaginary central line of the first image zone and the second image zone.

7. The method according to claim 6, wherein, for each of the micro-images, the first image pixel is disposed at or adjacent to an edge of the first image zone, and the second image pixel is disposed at or adjacent to an edge of the second image zone, which is symmetrical to the edge of the first image zone with respect to the imaginary central line.

8. The method according to claim 7, wherein, for each of the micro-images, the first image pixel is located at or adjacent to a center of the edge of the first image zone, and the second image pixel is located at or adjacent to a center of the edge of the second image zone.

9. The method according to claim 1, wherein each of the image zones has a plurality of pixels each having a pixel value, and in step (b), the image pixel value is obtained from the $i^{th}$ image zone by averaging the pixel values of the pixels of the $i^{th}$ image zone.

10. A light-field camera comprising:
a main lens, a micro-lens array including a plurality of microlenses, and a light sensing component arranged in order from an object side to an image side,
said main lens to collect light field information from a scene,
said micro-lens array to form a plurality of adjacent micro-images at different positions of said light sensing component according to the light field information collected by said main lens, each of the micro-images corresponding to a respective one of said microlenses, and including first to $n^{th}$ image zones that respectively correspond to first to viewing angles, where n is an integer and n≥2; and
an image processing module including:
an image processing unit to generate a number n of camera images respectively corresponding to the first to $n^{th}$ viewing angles, each of the camera images being generated by:
obtaining an image pixel value from an $i^{th}$ image zone of each of the micro-images, so as to form one of the camera images that corresponds to the $i^{th}$ viewing angle, where i is a positive integer and i≤n; and
an image synthesizing unit to combine the camera images to generate a three-dimensional (3D) image.

11. The light-field camera according to claim 10, wherein, for each of the image zones, the image pixel value obtained therefrom is associated with at least one pixel that is completely covered by a projection of the corresponding one of said microlenses onto said light sensing component.

12. The light-field camera according to claim 10, wherein each of the image zones has at least one pixel each having a pixel value, and the image pixel value obtained from the $i^{th}$ image zone of each of the micro-images is associated with the pixel value of one of said at least one pixel of the $i^{th}$ image zone.

13. The light-field camera according to claim 12, wherein the image pixel value obtained from the $i^{th}$ image zone of each of the micro-images is the pixel value of one of said at least one pixel of the $i^{th}$ image zone.

14. The light-field camera according to claim 12, wherein each of the image zones has a plurality of said pixels, and the image pixel value obtained from the $i^{th}$ image zone of each of the micro-images is a weighted value of the pixel value of one of the pixels of the $i^{th}$ image zone, and the pixel values of the pixels in a vicinity of said one of the pixels of the $i^{th}$ image zone.

15. The light-field camera according to claim 12, wherein:
n=2, and each of the micro-images includes a first image zone and a second image zone;
the image pixel value obtained from the first image zone is a first image pixel value, and the image pixel value obtained from the second image zone is a second image pixel value;
for each of the micro-images, said one of said at least one pixel of the first image zone whose pixel value is associated with the first image pixel value is a first image pixel, and said one of said at least one pixel of the second image zone whose pixel value is associated with the second image pixel value is a second image pixel; and
the first image pixel and the second image pixel are disposed at symmetrical positions with respect to an imaginary central line of the first image zone and the second image zone.

16. The light-field camera according to claim 15, wherein, for each of the micro-images, the first image pixel is disposed at or adjacent to an edge of the first image zone, and the second image pixel is disposed at or adjacent to an edge of the second image zone, which is symmetrical to the edge of the first image zone with respect to the imaginary central line.

17. The light-field camera according to claim 16, wherein, for each of the micro-images, the first image pixel is located at or adjacent to a center of the edge of the first image zone, and the second image pixel is located at or adjacent to a center of the edge of the second image zone.

18. The light-field camera according to claim 10, wherein each of the image zones has a plurality of pixels each having a pixel value, and the image pixel value is obtained from the $i^{th}$ image zone by averaging the pixel values of the pixels of the $i^{th}$ image zone.

* * * * *